March 16, 1965   H. S. HENDRICKSON   3,173,631
AIRCRAFT YAW TRIM CONTROL MECHANISM
Filed Dec. 1, 1960   3 Sheets-Sheet 1

INVENTOR.
HAROLD S. HENDRICKSON
BY Teller & McCormick
ATTORNEYS

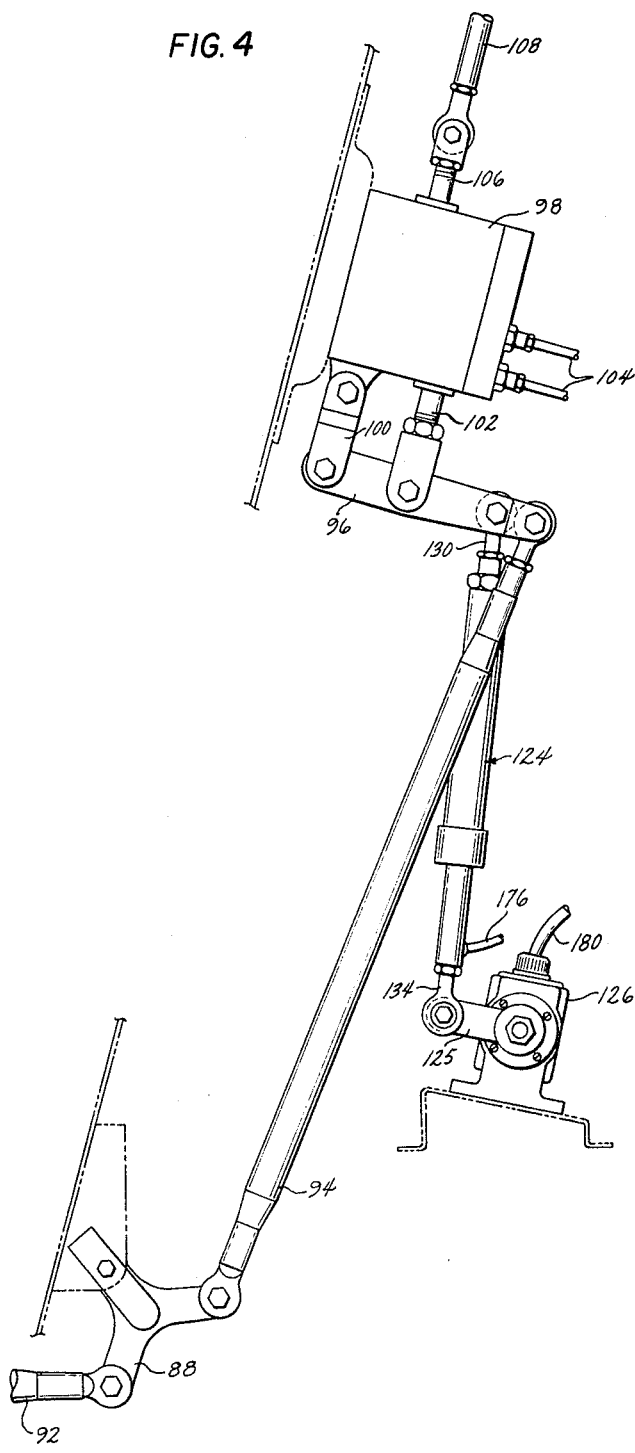
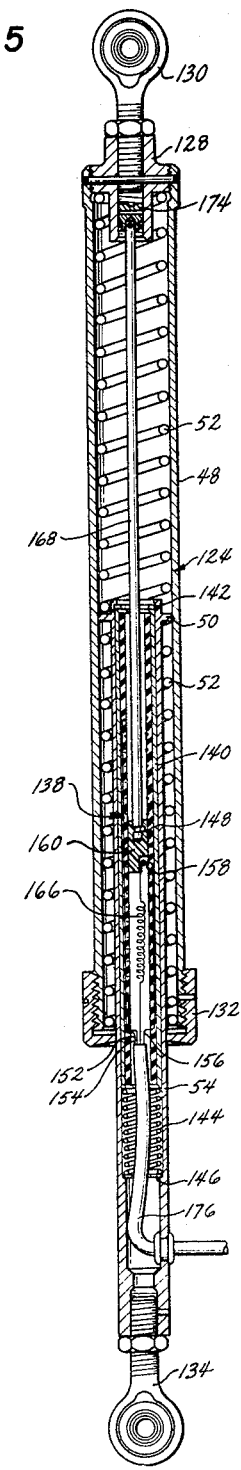
FIG. 4
FIG. 5

United States Patent Office 3,173,631
Patented Mar. 16, 1965

3,173,631
AIRCRAFT YAW TRIM CONTROL MECHANISM
Harold S. Hendrickson, Bloomfield, Conn., assignor to Kaman Aircraft Corporation, a corporation of Connecticut
Filed Dec. 1, 1960, Ser. No. 73,076
18 Claims. (Cl. 244—83)

This invention relates to mechanism for controlling the yaw trim attitude of aircraft, and deals more particularly with a means for automatically reducing to zero the manual force on the yaw control device required to maintain a given yaw trim attitude under a given set of flight conditions.

The yaw trim control mechanism provided by this invention is illustrated and described herein as embodied in a helicopter in which yawing movements are produced and controlled by collectively changing the pitches of the blades of anti-torque rotor carried by the tail section or empennage. It will be clear from the description, however, that in at least its broader aspects the invention is equally applicable to other types of aircraft, including fixed and rotary wing aircraft having rudders or other means for producing and controlling yawing movements. The invention is therefore not to be considered as limited to the particular aircraft shown, or to helicopters, the illustrated aircraft being shown by way of example only.

In the control system for maneuvering an aircraft it is generally desirable, in regard to the yaw controls, that the rate of turning be generally proportional to the applied pedal or other control force, and that the rate of turn be zero when the pedal force is zero. In the past this has sometimes been accomplished by the use of a servo device connected with the pedals or other yaw control element and operable to provide the proper output force or movement required to actuate the yaw control means with little or no input force, the output force being dependent on the pedal position and not on the force exerted on the servo device by operation of the pedals. The desired force gradient was then in turn applied to the pedals by the use of a spring device or bungee which opposed pedal movement in either direction from a given zero force position. By means of a manually operated trimming actuator the spring device or bungee could be adjusted so that the zero force position of the pedals corresponded to the pedal positions required to maintain the aircraft in a trim attitude. With such an adjustment of the bungee zero pedal force would be required to maintain the aircraft in trim. If it was desired to turn at a given rate a certain pedal force, proportional to the desired turning rate, would be applied and the turn would be executed. To stop the turn, the pedal force would be reduced to zero and the turning would stop.

This system works well for one airspeed, but at other airspeeds, particularly in the case of a helicopter, constant pedal force generally has to be applied to keep the aircraft from turning. The force can be reduced to zero by the use of the manually operated trimming actuator to realign the zero force position of the bungee with the trim pedal position. This arrangement is generally satisfactory for intermittent trimming control such as used to reduce to zero the pedal force required to maintain different headings under different cross winds. But, during certain critical periods, such as take-off and landing by a helicopter, the arrangement has limitations. In a helicopter with a single lifting rotor, for example, the rotor torque imposed on the fuselage varies rather rapidly over a wide range during take-off and landing. To prevent the fuselage from turning under the influence of this torque requires the pilot's operation of the foot pedals or other yaw control device. While it is highly desirable that the pedal force be zero for a zero rate of turn during these periods, the pedal position corresponding to zero rate of turn usually changes too rapidly for the pilot to make proper adjustment of the manually operated trimming actuator. Besides, during these periods, the pilot's attention is generally concentrated on the operation of other more important controls so that he is unable to devote any time to the trimming actuator.

The general object of this invention is therefore to provide a trimming mechanism which functions continuously and automatically, without the attention of the pilot, to reduce to zero the pedal or other manual control force required to maintain a given yaw trim attitude. That is, this object contemplates the provision of a trimming means whereby the pedal force is continuously and automatically adjusted so that for any given set of flight conditions a zero pedal force corresponds to a zero rate of turn and a given pedal force results in a generally proportionately related rate of turn.

A more particular object of this invention is to provide a trimming system including a neutralizing device which functions to sense the pedal or other manual force required to maintain a given heading, or zero rate of turn, and to then automatically adjust the bungee or other biasing device to reduce the manual force to zero. In keeping with this object of the invention, it is a further object to provide means whereby the said neutralizing device is effective to neutralize those manual control forces required to maintain trim attitudes under various flight conditions and is ineffective to neutralize those manual control forces applied to produce desired turning of the aircraft.

Other objects and advantages of the invention will be apparent from the following description and from the drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 4 is an enlarged elevational view of a portion of the control system shown in FIG. 3.

FIG. 5 is a longitudinal cross sectional view of the bungee employed in the control mechanism of FIG. 3.

*General organization of the helicopter*

Figure 1:
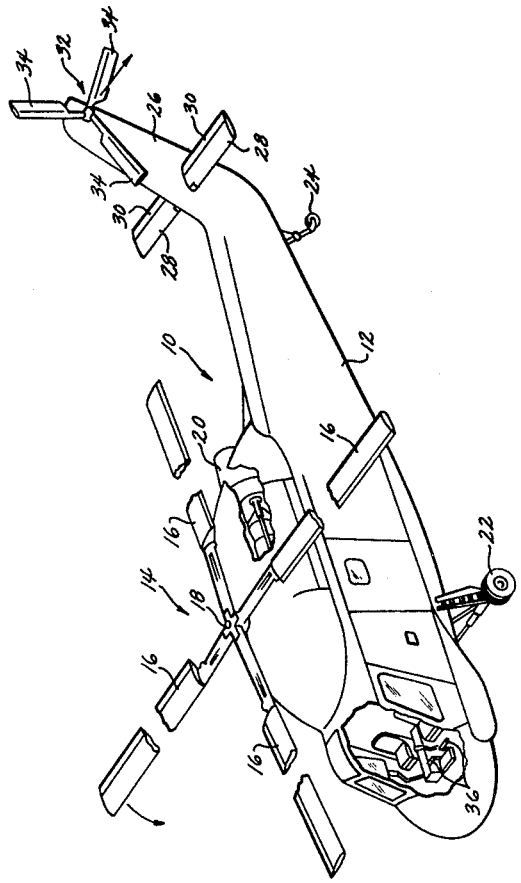
FIG. 1 is a perspective view looking toward the front and left-hand side of a helicopter which may be adapted to include a control mechanism embodying the present invention.

Referring to the drawings, FIG. 1 shows a helicopter to which the yaw trim mechanism of this invention may be applied.

The illustrated helicopter, indicated generally by the reference numeral 10, includes a fuselage 12 and a single lifting rotor 14 located above the fuselage. The rotor 14 consists of four blades 16, 16 connected to a hub 18 which hub is connected to a generally vertical drive shaft and rotated through a suitable transmission by a turbine engine 20. Toward the front end of the fuselage 12 the helicopter has two retractable landing wheels located respectively on either side of the fuselage, only one of these wheels being visible in FIG. 1 and indicated by the reference numeral 22. At the rear or tail end of the fuselage is a tail wheel 24. Also at the tail end of the fuselage is an upwardly extending vertical fin 26 and two horizontal stabilizers 28, 28 which respectively extend laterally from either side of the fin 26. Each of the stabilizers 28, 28 has an elevator 30 at its trailing edge which elevator is deflectable relative to the stabilizer to vary the tail lift exerted on the helicopter during forward flight.

The rotor 14 is not only operable to provide a lifting thrust for sustaining the helicopter during flight, but is also operable to provide a forward component of thrust for propelling the helicopter forwardly during forward flight and to provide different control moments and forces on the helicopter for maneuvering the same. Each of the four blades 16, 16 of the rotor is independently adjustable about its longitudinal axis to change its pitch and connected with the blades are suitable means by which the pilot may control the blade pitches to provide the desired amount of lifting and propulsive thrust and the desired degree of other control moments and forces. To change the basic thrust of the rotor the pitches of the blades 16, 16 may be changed collectively. That is, the pitches of all four blades may be changed simultaneously to the same extent and in the same direction. An increase in the collective pitch has the general effect of increasing the thrust, and a decrease in the collective pitch has the general effect of decreasing the thrust, without changing the direction of the thrust vector relative to the fuselage. In addition to this collective pitch change the blade pitches may also be changed in a cyclic manner. That is, as the rotor rotates the pitches of the blades are cyclically changed so that the blades repeatedly attain a minimum pitch when at one point along the blade tip path and repeatedly attain a maximum pitch when at the diametrically opposite point along the blade tip path. The net effect of the cyclic pitch change is equivalent to tilting the axis of the rotor in a vertical plane passing through the points of maximum and minimum pitch. The thrust vector of the rotor is therefore inclined from the vertical or substantially vertical axis of the rotor drive shaft and acts to move the helicopter in the direction of inclination. For example, if the blade pitches are changed cyclically in such a manner that the thrust vector is inclined forwardly there will be produced a forward component of thrust which acts to move the helicopter forwardly. This forward component of thrust will also act at a distance from the helicopter center of gravity and therefore produce a nose down pitching moment on the fuselage which may be counteracted by proper operation of the elevators 30, 30 if desired. If the blade pitches are changed cyclically in such a manner that the thrust vector is inclined laterally to one side of the fuselage there will be produced a lateral component of thrust tending to move the helicopter sideways and also a rolling moment tending to rotate the helicopter about its roll axis.

In order to rotate the rotor to produce thrust, power and torque must of course be supplied thereto. This means that a similar torque is applied to the fuselage tending to move the fuselage about a vertical yaw axis relative to the ground. For example, if in looking down from above the helicopter the rotor is rotated in a counterclockwise direction, as shown in FIG. 1, a torque will be applied to the fuselage tending to rotate it in the same counterclockwise direction. This torque on the fuselage is in turn counteracted by an anti-torque rotor 32 carried by the fin 26. The rotor 32 comprises three adjustable pitch blades 34, 34 which are connected to a hub driven in rotation about a transverse axis by suitable drive mechanism powered by the engine 20. The thrust produced by the rotor 32 therefore acts transversely of the fuselage and usually, except during autorotation, in the direction shown by the arrow to produce a clockwise moment on the fuselage acting in opposition to the torque imposed thereon by the lifting rotor 14. During steady forward flight the pitches of the anti-torque rotor blades are collectively adjusted to provide a thrust corresponding to a yaw moment that exactly balances the otherwise unbalanced moments about the yaw axis, the unbalanced moments generally being due primarily to the lifting rotor torque. The helicopter will therefore fly in a straight forward path without turning. When it is desired to turn, the turn may be accomplished by collectively decreasing or increasing the pitches of the anti-torque rotor blades to produce an unbalanced moment acting in one direction or another about the yaw axis.

The collective pitches of the anti-torque rotor blades are controlled by the pilot by means of a suitable pilot operable device which is movable in opposite predetermined directions to increase or decrease respectively the collective pitches and to thereby increase or decrease the transverse thrust produced by the anti-torque rotor. In the present case this means consists of a pair of foot pedals 36, 36 which are pivotally mounted with respect to the fuselage for movement in a generally fore and aft direction. The pedals are arranged for movement in unison but in opposite directions so that forward movement of either one of the pedals results in rearward movement of the other pedal. Thus, forward movement of the left pedal may be obtained by pressing forwardly thereon and rearward movement obtained by pressing forwardly on the right pedal. Likewise, forward movement of the right pedal may be obtained by pressing forwardly thereon and rearward movement obtained by pressing forwardly on the left pedal. Therefore, either one of the foot pedals acting in conjunction with the other foot pedal may be considered as a pilot operable device movable in predetermined opposite directions. Assuming that the helicopter is undergoing steady forward flight, forward movement of the left pedal 36 will decrease the pitches of the anti-torque rotor blades and cause the helicopter to turn to the left. Forward movement of the right pedal will increase the pitches of the anti-torque rotor blades and cause the helicopter to turn to the right.

In addition to operating the foot pedals to execute turning movements, the pilot must also adjust the same to keep the helicopter in trim, or to prevent its turning, during steady forward flight under different speed conditions. In the illustrated helicopter, for example, 30% left pedal is required to prevent turning during hover, zero pedals are required at about 30 knots speed, and 20% to 40% right pedal is required in cruise. Also, other different pedal positions are required during take-off and landing in order to prevent undesired turning. Here, zero pedals refer to the positions assumed by the pedals when both pedals are transversely aligned, 30% left pedal refers to the positions assumed by the pedals when the left pedal is displaced forwardly from the zero pedal position by an amount equal to 30% of its full range of forward travel from the zero pedal position, and 20% to 40% right pedal refers to the positions assumed by the pedals when the right pedal is displaced forwardly from the zero pedal position by an amount equal to 20% to 40% of its full range of forward travel from the zero pedal position.

As mentioned previously, it is desirable that the turning rate of the helicopter be generally proportional to the force applied to the foot pedals and that a zero rate of turn correspond to a zero force on the pedals. For purposes of discussion, the pedal position required to maintain a zero rate of turn under a given set of flight conditions is for convenience sometimes referred to herein as the "neutral position" and the position assumed by the pedals when no force is applied thereto is referred to as the "zero force position." This then means that in order to obtain the desired characteristics of rate of turn versus pedal force that the neutral position be the same as the zero force position. However, as noted above the neutral position is dependent on the flight conditions and varies, for example, between 30% left pedal for hovering, to 20% to 40% right pedal for cruise. Therefore, the zero force position must be shifted accordingly.

*General organization of the yaw trim control mechanism*

Figure 2:
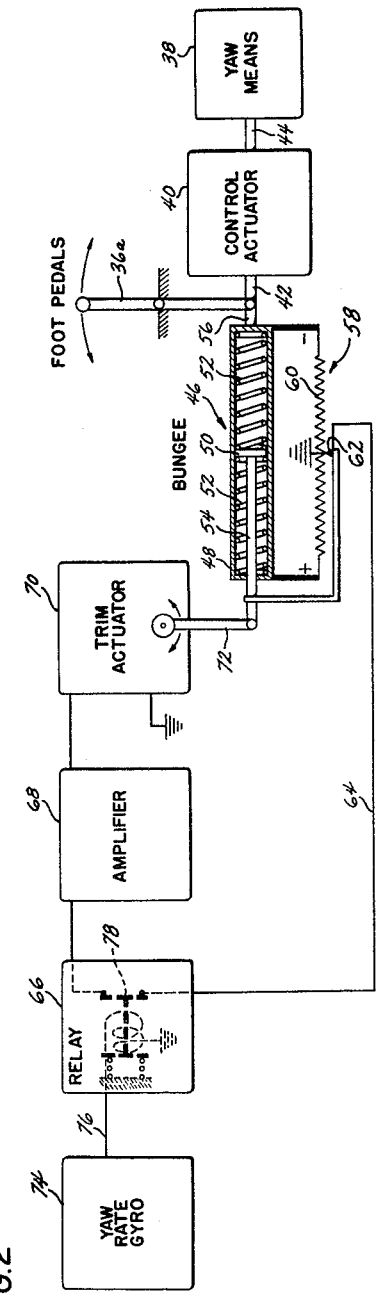
FIG. 2 is a schematic representation, basically in block diagram form, illustrating the relationship between various components of a control mechanism embodying the present invention and adapted for incorporation into a helicopter such as that shown in FIG. 1.

The yaw trim control mechanism proposed by this invention, and as shown schematically in one embodiment by FIG. 2, is adapted to automatically shift the zero force position of the foot pedals or other pilot operable yaw control device in accordance with shifts in the neutral position so that the desired pedal force versus rate of turn characteristic will be maintained at all flight conditions.

Referring to FIG. 2 the boxes indicated at 38 and 40 represent a yaw control means operable by the foot pedals. In this figure only one foot pedal 36a is shown and is assumed to be movable in either direction from the position shown, as indicated by the arrows. The box 38 by itself represents a means operable to impart a yaw moment on the aircraft for controlling its rate of turn. Although the means may take various different forms in different aircraft, in the illustrated helicopter 10 it consists of the anti-torque rotor 32 and the associated linkage for changing the pitches of the blades 34, 34. The box 40 represents a suitable servo device or control actuator of the power booster variety having an input member 42. The input member 42 is substantially freely movable with respect to the other parts of the control actuator, and the control actuator is effective to produce given output movements of an output member 44 in response to movements of the input member regardless of the force exerted on the output member. The output member 44 is in turn connected with the yaw means 38 and is operable to control the yaw moment exerted on the aircraft by the yaw means. Generally, a considerable amount of control force must be exerted on the member 44 to hold the yaw means at a given setting, and in this case the control actuator functions to isolate this force from the input member 42 and the foot pedal so that the input member is movable with a relatively small amount of force which is independent of the control force on the output member.

Also connected with the foot pedal is a biasing means, preferably a bungee 46 as shown in FIG. 2, which is adapted to oppose movement of the foot pedal in either direction from a zero force position. As shown, and as described in more detail hereinafter, the illustrated bungee 46 includes a cylinder 48, a piston 50 slidably supported within the cylinder, and two springs 52, 52 located within the cylinder on opposite sides of the piston. Connected with the piston is a rod 54 which extends axially through one of the springs and beyond one end of the cylinder 48. The cylinder is connected with the foot pedal for movement thereby by suitable means illustrated schematically in FIG. 2 as a rod 56. Assuming that the piston 50 is fixed or stationary the two springs 52, 52 will tend to move the cylinder 48 and the foot pedal to positions at which the spring forces imposed on opposite sides of the piston are equalized, and will oppose movement of the cylinder and foot pedal in either direction from such positions. The position assumed by the foot pedal when the spring forces on the piston are equalized is the zero force position referred to above.

Associated with the bungee is a means, such as a potentiometer 58, for producing an electrical output signal related to the direction and magnitude of the biasing force exerted on the foot pedal. For example, in the illustrated situation the potentiometer includes a slide wire 60 fixed relative to the cylinder 48. The slide wire is adapted to have a D.C. voltage imposed across its end terminals and has a grounded center point. While D.C. voltage has been referred to, it will be understood however that the invention is not so limited. Fixed to the piston rod for movement therewith is a sliding contact 62 which engages the slide wire 60 and is adapted to be positioned on the grounded center point of the slide wire when the piston 50 and cylinder 48 are so relatively arranged as to equalize the spring forces on the piston. That is, the contact 62 will be grounded when the pedal 36a is in its zero force position. Thus, the potentiometer is adapted to provide a zero output voltage, measured between the sliding contact and ground, when the illustrated pedal is in its zero force position, to provide a positive output voltage when the pedal is displaced in one direction from its zero force position, and to provide a negative output voltage when the pedal is displaced in the other direction from its zero force position. Likewise, the output voltages, whether negative or positive, will be substantially proportionally related to the magnitude of the biasing force exerted on the pedal or, from another viewpoint, substantially proportionally related to the displacement of the pedal from its zero force position. Although FIG. 2, for convenience, shows the potentiometer located externally of the cylinder 48 with the slide wire fixed relatively to the cylinder, it may also, as is preferred and as is shown in the actual mechanism hereinafter described, be located within the cylinder with the slide wire fixed relatively to the piston and the sliding contact fixed relatively to the cylinder.

The output signal from the potentiometer 58 is transmitted by suitable means, such as a conductor 64, through a normally closed relay device, indicated by the box 66, to an amplifier 68, and from the amplifier 68 the amplified signal is fed to a trim actuator 70. The trim actuator 70 has a movable output member or arm 72 connected with the piston rod 54 and is automatically operable in response to the amplified signal to move the rod 54 in such a direction as to reduce, and finally bring to zero, the biasing force exerted by the bungee on the foot pedals by equalizing the spring forces on the piston. In other words, the potentiometer acts to sense the manual force that must be applied to the foot pedal to hold the same in a given position (the manual force being equal and opposite to the biasing force) and the trim actuator acts in response to the output of the potentiometer and in cooperation with the bungee to neutralize the manual force so that after the actuator has performed its function zero manual force will be required to hold the pedal in the given position.

To better understand this operation of the control mechanism, assume that in FIG. 2 the zero force position of the illustrated foot pedal 36a is the position shown. Therefore, the cylinder and piston of the bungee will be at such relative positions that the sliding contact 62 is aligned with the grounded point of the slide wire and no output signal will be transmitted to the trim actuator. Consequently, no movement of the arm 72 or piston rod 54 will occur. Now, assume further that in order to prevent the aircraft from turning the pedal 36a is moved to and held at a neutral position reached by moving the pedal counterclockwise from the illustrated position. This will cause the cylinder 48 to be moved to the right and to compress the left-hand spring 52 creating an unbalanced spring force on the cylinder and foot pedal which tends to return the pedal to the zero force position. Thus, to hold the foot pedal in the neutral position the pilot must apply a manual force on the pedal in opposition to the spring or biasing force exerted thereon by the bungee.

The displacement of the cylinder to the right also causes the slide wire 60 to be moved relative to the contact 62 and, if the polarity of the D.C. voltage applied to the slide wire is as indicated in FIG. 2, will apply a positive potential or voltage to the contact 62 relative to the ground. This voltage is then transmitted through the amplifier 68 and to the trim actuator 70, which, in response to the positive polarity of the voltage signal, will move the arm 72 counterclockwise. The piston rod 54 and the piston 50 are in turn moved to the right, unloading the left-hand spring 52 and thereby reducing the biasing force exerted on the foot pedal. At the same time, the contact 62 will also be moved to the right and toward the grounded middle point of the slide wire, causing the voltage of the signal applied to the actuator 70 to be reduced. The actuator, however, will continue to move the arm 72 counterclockwise until the contact 62 is realigned with the grounded middle point of the slide wire. When this realignment occurs, the voltage applied to the actuator will be zero and the movement of the arm 72 will stop. At this point the piston 50 will also be repositioned relative to the cylinder so that the spring forces are again equalized and a zero biasing force is exerted on the pedal 36$^a$. Thus, the zero force position of the pedal is brought into alignment with the neutral position and the manual force required to be exerted on the pedal to maintain the neutral position is neutralized or reduced to zero.

Of course, it is desirable that the above described neutralization of the manual pedal force occur only in regard to those forces which are applied for the purpose of keeping the aircraft in trim, and that no neutralization occur in regard to pedal forces applied for the purpose of effecting desired turning. This is provided for in the present system by providing a means for interrupting the transmission of the potentiometer signal to the trim actuator when the rate of turn exceeds a predetermined absolute value. That is, considering a turn in one direction to be positive and a turn in the opposite direction to be negative, the means contemplated by this invention is operable to interrupt the signal to the trim actuator whenever the magnitude of the rate of turn exceeds a given value regardless of the sign or direction of the turn. Although this means may take various forms, it preferably, as indicated in FIG. 2, consists of a yaw rate gyro 74 operating in conjunction with the relay 66. The yaw rate gyro may be of any suitable conventional construction which is adapted to sense the rate of turn of the aircraft and to provide an electrical output signal related to the rate of turn. In the illustrated case the rate gyro 74 produces an output voltage which is generally proportional to the rate of turn and which is transmitted by the line 76 to the relay 66. The relay 66 is in turn operable to open the contacts indicated at 78 when the voltage supplied thereto exceeds a given value and to close the contacts when the voltage falls below such given value. To better understand the operation of the relay, it has been shown schematically in FIG. 2 as a mechanical switching device. It should, however, be understood that the other well known devices, such as a vacuum tube or transistor switching circuit, could also be employed to perform the function of the relay. The rate of turn at which switching occurs may be varied somewhat without seriously impairing the functioning of the system. However, a rate of turn of approximately 3 degrees per second has been found to produce highly satisfactory results in regard to a helicopter such as shown in FIG. 1 and will be assumed in the discussion which follows.

To better understand the operation of the rate gyro 74 and relay 66 assume that the helicopter of FIG. 1 is travelling in a straight forward path. Under this condition of flight, the rate gyro will develop no output signal and the relay contacts 78 will remain closed. Should the pilot find that a pedal force is required to maintain the straight forward path, the trim actuator 70 and the other parts of the control mechanism will be operable, as described above, to reduce the pedal force to zero without disturbing the positions of the pedals. Now, however, assume that the pilot desires to execute a turn in one direction. To accomplish this, he pushes forward on the proper pedal and the aircraft begins its turn. As the rate of turn reaches 3 degrees per second, the output voltage or other signal of the rate gyro becomes sufficient to operate the relay 66 with the result that the contacts 78 are opened and the signal to the trim actuator 70 interrupted. The trim actuator is therefore deactivated and will hold the output member 72 and the piston rod in a fixed position so that a biasing force is exerted on the pedal in opposition to the manual force. When the turn is executed, the pilot releases the force applied to the pedal, the biasing force returns the pedal to the original neutral position, and the turn stops, assuming that the aerodynamic forces on the aircraft after the turn are substantially the same as before the turn. However, because of a change in heading with respect to a cross wind, for example, the pilot may find that a different pedal position is required to maintain trim after the turn. If this is so, the described mechanism will again function to reduce to zero the pedal force required to hold the new pedal position.

It will be noted, when making a desired turn, that during the time required for the aircraft to pass from a zero to a 3 degree per second rate of turn the contacts 78 will be closed. It would therefore be expected that during this interval some adjustment of the bungee and shifting of the zero force position would occur. Depending on the performance characteristics of the amplifier and trim actuator this may actually occur; however, the amount of such undesired shifting may be held to a minimum or entirely eliminated by proper design of the amplifier and/or trim actuator. First, the trim actuator 70 may be designed to operate at a sufficiently slow speed that very little adjustment of the bungee would take place during the relatively short time required for the aircraft to pass beyond the 3 degree per second rate of turn. Second, the amplifier-trim actuator combination may be designed with a speed of response or time delay which is greater than the time generally required for the aircraft to pass from a zero to a 3 degree per second rate of turn. In the present system, for example, it was found that a three to four second speed of response produced quite satisfactory results. That is, the amplifier and trim actuator were designed so that no movement of the arm 72 occurred until three to four seconds after the initiation of a signal to the amplifier 68.

*Detailed description of yaw trim control mechanism*

Figure 3:
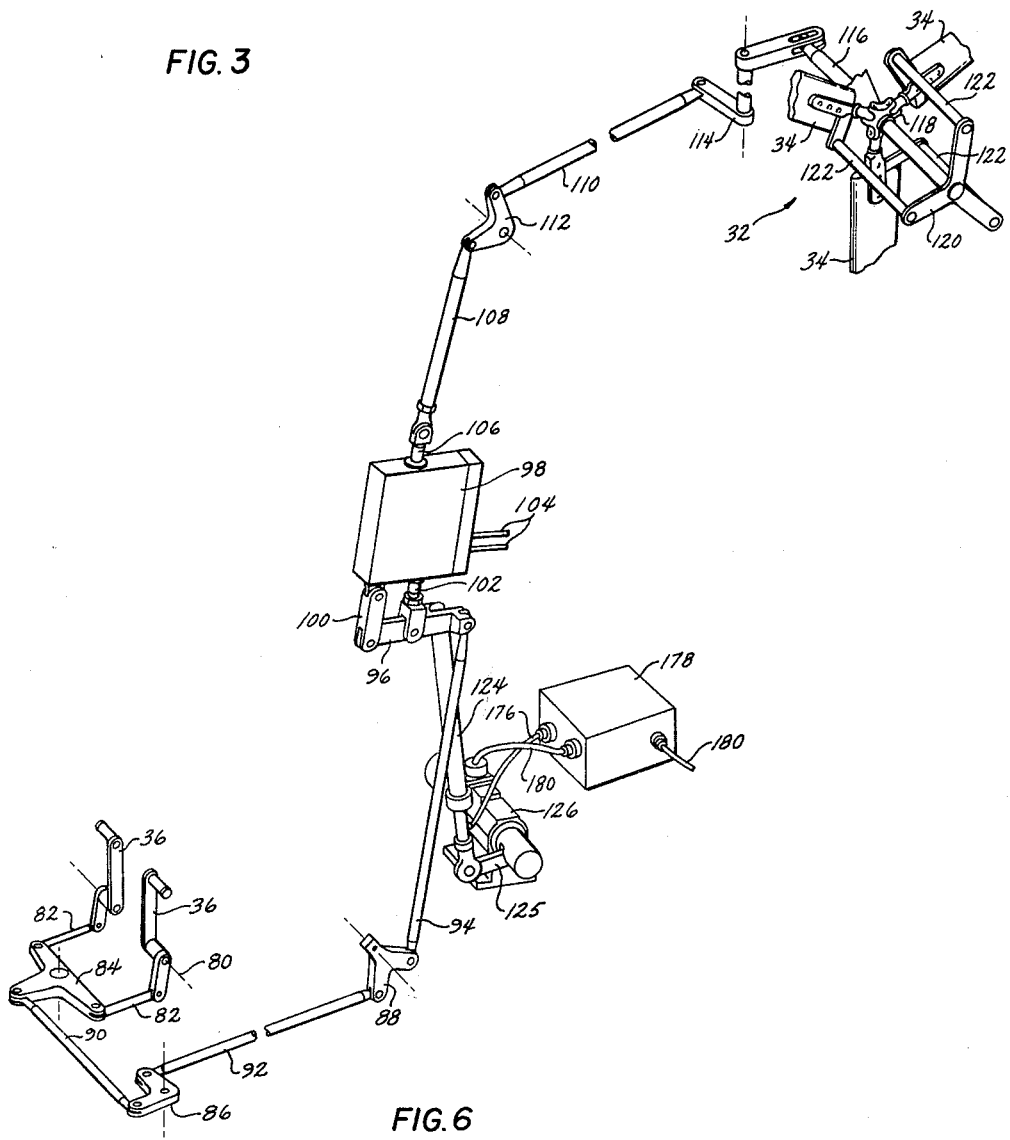
FIG. 3 is a perspective view of an actual control mechanism embodying this invention and corresponding to the mechanism shown schematically in FIG. 2.
Figure 6:
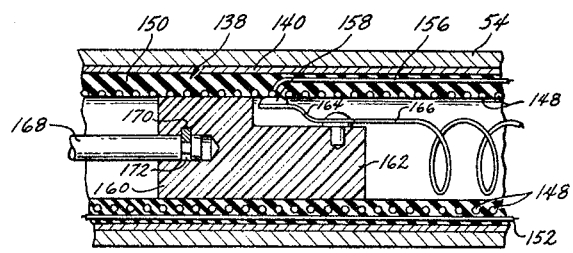
FIG. 6 is an enlarged fragmentary view of the bungee shown in FIG. 5.

Reference is now made to FIGS. 3 and 4 which show the actual linkage and other components of a yaw trim mechanism adapted for use with the helicopter 10 of FIG. 1 and embodying the system shown schematically by FIG. 2 and to FIGS. 5 and 6 which show the actual construction of a bungee adapted for use with the mechanism of FIGS. 3 and 4.

Turning first to FIGS. 3 and 4, it will be noted that the foot pedals 36, 36 are supported for pivotal movement about a common axis 80 and have their lower ends connected respectively by means of two rods 82, 82 to two arms of a three-armed lever 84. The remaining arm of the lever 84 is connected by means of bell cranks 86 and 88 and rods 90, 92 and 94 to the lever 96 of an hydraulic power booster or servo device 98. The lever 96 is in turn pivotally connected to the body of the device 98 by a link 100. Also connected to the lever 96 is a reciprocable input member 102 adapted to be displaced relative to the body of the device 98 by the pivotal movement of the lever 96. The device 98 corresponds generally to the control actuator 40 indicated schematically in FIG. 2, the foot pedals 36, 36 correspond to the foot pedal 36$^a$ of FIG. 2, and the input member 102 and the illustrated motion transmitting linkage between the foot pedals and the input member correspond generally to the input member 42 of FIG 2. Forward movement of the left pedal 36 will cause the lever 96 to extend the input member 102 from the body of the device 98, while forward movement of the right pedal 36 will cause the lever 96 to retract the input member 102.

The booster device 98 is operated by high pressure hydraulic fluid supplied to and exhausted from the device by a pair of hydraulic lines 104, 104. The device 98 by itself forms no part of this invention, and various suitable devices are commercially available and well known to the art. Therefore, its construction will not be described in detail. For the purposes of this description it is sufficient to note that the input member 102 is relatively freely movable, that is, with little force, relative to the body of the device and operates a valving arrangement which controls the flow of high pressure fluid to a piston for moving a reciprocable output member 106, in such a manner that the position of the output member is dependent on the position of the input member. The output member 106 is therefore moved by hydraulic pressure, and is capable of delivering or absorbing considerable power in so doing, in response to the movement of the input member 102. Therefore, the force imposed on or exerted by the output member 106 is isolated from the input member 102. In the illustrated device the construction is such that the output member moves similarly to the input member; i.e., extension of the input member 102 results in extension of the output member 106, while retraction of the input member results in retraction of the output member. Obviously, however, by means of a slight rearrangement of the motion transmitting linkage connected with the device 98, a device wherein the output member moves oppositely to the input member could also be used.

Connected with the output member 106 of the power booster device 98 is a suitable means for transmitting the motion of the output member to means for changing the pitches of the anti-torque rotor blades 34, 34. As shown, this motion transmitting means comprises the rods 108 and 110, a bell crank 112 and an offset bell crank 114. The free or upper arm of the offset bell crank is connected with a collective pitch control rod 116 which passes through the hub 118 of the anti-torque rotor 32 and has a three-armed spider 120 fixed to its outer end. Each arm of the spider is in turn connected with a respective one of the blades 34, 34 by a rod 122 which serves to move the blade about its longitudinal axis to change its pitch when the collective pitch control rod is reciprocated relative to the hub. The hub is driven in rotation about its central axis, which is coincident with the axis of the control rod 116, by suitable drive mechanism, not shown, connected with the engine 20. Extension of the power booster output member 106, as a result of pressing forward on the left pedal 36, causes the control rod 116 to be moved outwardly, or generally toward the viewer in FIG. 3, and the three blades 34, 34 to be moved simultaneously and to the same extents in the direction of decreasing pitch. Retraction of the output member 106, caused by pressing forward on the right pedal 36, on the other hand, results in movement of the control rod 116 in a direction generally away from the viewer to increase the pitches of the blades 34, 34. In comparing FIG. 2 to FIG. 3, the rod 108 and all parts to the right thereof, including all parts of the rotor 32, may be considered to correspond to the yaw means indicated at 38 in FIG. 2, and the output member 106 of the power booster device 98 may be considered to correspond to the output member indicated at 44 in FIG. 2.

The pedals 36, 36 of the mechanism shown in FIG. 2 are biased by means of a bungee 124 having one end connected to the lever 96 of the power booster device 98 and having its other end connected to the arm 125 of a servomotor 126. The bungee 124 corresponds generally to the bungee 46 shown schematically in FIG. 2, and the servomotor 126 corresponds generally to the trim actuator 70 also shown schematically in FIG. 2. The construction of the bungee 124 is shown in detail in FIGS. 5 and 6 wherein for the purpose of clarity the major parts have been given the same reference numerals as the corresponding parts of the bungee 46 of FIG. 2.

It will therefore be noted that the bungee 124 includes a cylinder 48, a piston 50, two springs 52, 52 located respectively on opposite sides of the piston, and a piston rod 54 connected with the piston 50 and extending through one end of the cylinder 48. As viewed in FIG. 5, the upper end of the cylinder 48 is provided with a closure member 128 which is threadably engaged with the cylinder and which in turn threadably receives an eye member 130 which is used to pivotally connect the bungee to the lever 96. The other end of the cylinder 48 is provided with a closure member 132 which is threadably received by the cylinder and provided with a bore through which the piston rod 54 passes. The lower end of the piston rod 54 threadably receives another eye member 134 which is used to connect the bungee to the arm 125 of the servomotor 126.

The piston rod 54 of the bungee 124 is hollow and fitted with a potentiometer 138 for sensing the displacement of the piston 50 in either direction from its zero force position with respect to the cylinder 48. Referring to FIGS. 5 and 6, the potentiometer 138 comprises a relatively long cylindrical case 140 received by the bore of the piston rod 54. The upper end of the case 140, as viewed in FIG. 5, engages a snap ring 142 and is held firmly in place against the snap ring by means of a spring 144 compressed between the lower end of the case and an apertured disc 146 seated against a shoulder formed in the bore of the piston rod.

Inside the case 140 the potentiometer includes a helical slide wire 148 embedded by a cylindrical or annular layer of insulating material 150. As viewed in FIG. 5, the upper end of the slide wire 148 is electrically connected with a lead 152 and the lower end of the slide wire connected with a lead 154, the leads 152 and 154 serving as a means for applying a D.C. voltage across the length of the slide wire. At or near the center point the slide wire is connected to another lead 156 which is electrically connected to ground. The leads 152, 154 and 156 are preferably embedded in the insulating material 150 and located radially outwardly from the slide wire 148 as shown in connection with the leads 152 and 156 in FIG. 6.

At one point along the inner circumference of the insulating material 150 the convolutions of the slide wire 148 are exposed so as to be capable of making electrical contact with a sliding contact 158 comprising part of a wiper 160. In addition to the contact 158, the wiper 160 includes a body 162 of insulating material having a cross section conforming generally to the cross section of the bore of the insulating material 150 and being loosely received thereby so as to be slidable longitudinally of the slide wire 148. The conforming cross sections of the body 162 and the bore of the insulating material 150 are preferably noncircular so that the body 162 is unable to rotate relative to the insulating material 150. Attached to the body 162 is an arm 164 of electrically conductive spring material which carries the contact 158 and presses the same against the exposed convolutions of the slide wire 148. Connected with the arm 164 is an output lead 166.

The wiper 160 is moved longitudinally of the slide wire 148 by means of a rod 168 which is fixed at one end to the closure member 128 and which extends from the closure member through one of the springs 52 and through a portion of the potentiometer case 140 to the wiper 160. As shown in FIG. 6, the inner end of the rod 168 extends into a corresponding hole in the body member 162 of the wiper and is axially fixed thereto by means of a key 170 which is received by an annular groove 172 in the rod 168. The connection provided by the key 170 and the groove 172 permits the rod 168 to rotate relative to the wiper body 162 while nevertheless fixing the same against axial relative movement. In order that the contact 158 may be accurately centered on the grounded convolution of the slide wire 148 when no force is applied between the ends of the bungee, the rod 168 is connected to the closure member 128 by means of an adjusting screw 174. The screw 174 may be operated to bring the contact 158 into proper relationship with the slide wire 148 by removing the eye member 130 from the closure member 128 and inserting a screwdriver into the bore vacated by the eye member. The two input leads 152 and 154, the ground lead 156 and the output lead 166 are combined into a single conductor cable 176 which passes through the wall of the piston rod 54 at its lower end, as shown in FIG. 5.

The potentiometer 138 shown in FIGS. 5 and 6 corresponds generally to the potentiometer 58 illustrated in FIG. 2, with the slide wire 148 corresponding to the slide wire 60, the contact 158 corresponding to the contact 62 and the lead 166 corresponding to the lead 64.

In considering the operation of the bungee 124, assume that the wiper 160 is properly adjusted so that when no force exists between the ends of the bungee the contact 158 will be in contact with the grounded convolution of the slide wire 148, and that a D.C. voltage is applied between the ends of the slide wire by the leads 152 and 154. It should then be obvious that the application of a compressive load between the ends of the bungee will displace the wiper to move the contact 158 in one direction away from the grounded slide wire convolution, thereby imposing an electrical potential of given polarity on the output lead 166, the magnitude of the potential being generally proportionally related to the displacement of the contact from the grounded convolution and to the magnitude of the force applied to the bungee. Likewise, if a tensile force is applied between the ends of the bungee the wiper 160 will be moved to displace the contact 158 in the opposite direction from the grounded convolution thereby imposing an electrical potential of opposite polarity to the output lead 166, with the magnitude of the potential being substantially proportional to the displacement of the wiper and to the magnitude of the tensile force.

As shown in FIG. 3, the conductor cable 176 associated with the bungee 124 is connected to a control package or box 178. The box 178 in turn contains a yaw rate gyro, a relay and an amplifier corresponding to those shown respectively at 74, 66 and 68 in FIG. 2. As mentioned in connection with FIG. 2, these latter elements by themselves form no part of the invention, may be of various conventional constructions, and therefore will not be described in detail. For purposes of this description it is sufficient to note that the control package 178 also includes a suitable means for supplying a D.C. potential to the potentiometer leads 152 and 154 and has associated therewith an output conductor 180 connected with the servomotor 126. The trim servomotor 126 may also be of various conventional constructions and consists basically of a reversible electric motor and associated gear reduction unit which is operable to rotate the arm 125 in one direction or the other depending on the nature of the electrical power supplied thereto by the conductor 180, the nature of the power delivered by the conductor 180 being in turn dependent on the magnitude and polarity of the potential applied to the output lead 166 of the potentiometer. That is, when the output lead 166 has a negative electrical potential imposed thereon the nature of the power delivered to the servomotor will be such as to cause rotation of the arm 125 in one direction, while when the output lead 166 has an electrically positive potential applied thereto the nature of the power delivered by the conductor 180 will be such as to cause rotation of the arm 125 in an opposite direction. Electrical power for operating the various components in the control package 178 is or may be supplied by a conductor cable 181 connected with an auxiliary power supply driven by the engine 20.

Referring to FIG. 3, the relationship between the polarity of the potential applied to the output lead 166 and the resultant movement of the arm 125 is such that when a compressive load is applied between the ends of the bungee 124 the arm 125 will be rotated in a counterclockwise sense so as to relieve or reduce the compressive load while a tensile load applied between the ends of the bungee will cause the arm 125 to be moved clockwise so as to relieve or reduce the tensile force.

*General operation of the yaw trim control mechanism of FIGS. 3 and 4*

Since the operation of the control mechanism shown schematically in FIG. 2 has been described in some detail above, the operation of the actual control system shown in FIGS. 3 and 4 may be briefly summarized as follows.

Let it be assumed that the helicopter 10 has been travelling in a straight forward path for some length of time so that no manual force need be applied to either of the foot pedals 36, 36 in order to prevent the helicopter from turning, and that it is now desired to execute a turn to the left. To do this the pilot presses forward on the left pedal 36. This motion is transmitted through the rods 82, 90, 92 and 94, the lever 84 and the bell cranks 86 and 88 to the lever 96, causing the lever 96 to be swung downwardly as viewed in FIG. 3. This downward movement of the lever 96 has two effects, the first of which is the extension of the input member 102 of the power booster 98 and the second of which is the compression of the bungee 124. The extension of the input member 102 results in a related extension of the output member 106. This extending motion of the output member is in turn transmitted to the collective pitch control rod 116 by means of the rods 108 and 110 and the bell cranks 112 and 114, and results in movement of the collective pitch control rod 116 toward the viewer in FIG. 3, or in such a direction as to collectively decrease the pitches of the anti-torque rotor blades 34, 34. This in turn decreases the thrust produced by the rotor 32 creating an unbalanced moment about the helicopter center of gravity tending to move the same toward the left or in a counterclockwise direction as viewed from above the helicopter.

The compression of the bungee 124 due to the movement of the lever 96 causes the same to apply a biasing force to the lever tending to oppose its swinging movement. This force is in turn transmitted through the motion transmitting linkage to the left pedal 36 and is substantially proportional to the displacement of the pedal from its initial position. As the helicopter starts to turn, the yaw rate gyro contained in the control package 178 senses the rate of turn and interrupts the transmission of the potentiometer output signal to the amplifier, also contained in the control package 178, when the rate of turn exceeds 3 degrees per second. As soon as the bungee 124 is compressed by the swinging movement of the lever 96, an output signal is developed by the potentiometer but no movement of the servomotor arm 125 occurs immediately due to a 3 to 5 second speed of response or delay characteristic for the amplifier and servomotor combination. Since the helicopter will generally exceed a rate of turn of 3 degrees per second in less than the 3 to 5 second response period of the amplifier and actuator, no movement of the arm 125 will occur during the execution of the turn. Therefore, since the arm 125 remains stationary, the bungee 124 will exert a biasing force on the left pedal 36 throughout the turn and will be effective to return the pedal to its initial or neutral position when the manual force is released. Thus, the pilot may stop the turn by simply removing the manual force from the pedal.

In executing a right turn, the functioning of the various parts of the control mechanism are substantially the same as during a left turn except for a difference in the direction of movement of the parts. For example, to turn to the right the pilot presses forward on the right foot pedal 36 which results in the lever 96 being swung upwardly, retracting the input member 102 and stretching the bungee 124. This in turn causes the output member 106 to be retracted with the result that the pitches of the antitorque rotor blades 34, 34 are increased to create increased tail thrust which turns the helicopter to the right. The bungee 124 likewise applies a biasing force to the lever 96 tending to oppose its upward movement and this force is in turn transmitted through the motion transmitting linkage to the right-hand pedal 36. During the right-hand turn the yaw rate gyro in the control package 178 will also function to interrupt the potentiometer signal to the amplifier when the rate of turn exceeds 3 degrees per second so as to prevent movement of the arm 125 and maintain the bias on the right pedal.

Assume now that because of a change in speed or heading or other disturbance a new pedal position is required to maintain the helicopter in trim. For example, assume that before the disturbance the helicopter remained in trim with the pedals in the relative positions shown in FIG. 3 and that after the disturbance the left pedal 36 has to be moved forwardly from the position shown to prevent the helicopter from turning. This forward movement of the left pedal 36 will again have the effect of swinging the lever 96 downwardly and of thereby compressing the bungee 124. This compression of the bungee displaces the contact 158 of the potentiometer from the grounded convolution of the side wire 148 and produces an output potential on the lead 166 which is transmitted to the amplifier 68. This time, however, since the helicopter is undergoing a zero rate of turn, the yaw rate gyro within the control package 178 will be ineffective to interrupt the transmission of the signal to the amplifier. Accordingly, after the lapse of the 3 to 5 second response time associated with the amplifier and servomotor, electrical power of the proper nature will be supplied to the servomotor through the conductor 180 to cause the arm 125 to be rotated in a counterclockwise sense, thereby relieving the load and biasing force on the lever 96. This rotation of the arm 125 will also cause the contact 158 of the potentiometer to be returned toward the grounded convolution of the slide wire, and rotation of the arm 125 will continue until the contact 158 is again aligned with the grounded convolution. When this occurs, the bungee will once again exert a zero biasing force on the lever 96 with the result that no manual force need be applied to the left pedal 36 to maintain the same in the new neutral or zero turn position.

The invention claimed is:

1. In a control mechanism for an aircraft, the combination of:
 yaw control means including a pilot operable device movable in predetermined opposite directions to change the turning rate of said aircraft,
 means for sensing the turning rate of said aircraft, and
 means operable only when the turning rate of said aircraft as measured by said sensing means is below a predetermined absolute value for automatically neutralizing the manual force applied to said pilot operable device.

2. In a control mechanism for an aircraft, the combination of:
 yaw control means including a pilot operable device movable in predetermined opposite directions to change the turning rate of said aircraft,
 means for sensing the turning rate of said aircraft, and
 means operable only when the turning rate of said aircraft as measured by said sensing means is below a predetermined absolute value for automatically reducing to zero the manual force required to be applied to said pilot operable device to hold the same in a given position.

3. In a control mechanism for an aircraft, the combination of:
 yaw control means including a pilot operable device movable in predetermined opposite directions to change the turning rate of said aircraft,
 means for sensing the turning rate of said aircraft,
 means for continuously sensing the manual force applied to said pilot operable device, and
 means controlled by said manual force sensing means and operable only when the turning rate of said aircraft is below a predetermined absolute value as measured by said turning rate sensing means for automatically neutralizing the manual force applied to said pilot operable device.

4. In a control mechanism for an aircraft, the combination of:
 yaw control means including a pilot operable device movable in predetermined opposite directions to change the turning rate of said aircraft,
 means for sensing the turning rate of said aircraft,
 means for continuously sensing the manual force applied to said device and for providing an output signal related to the direction and magnitude of said force,
 means responsive to said output signal for automatically neutralizing said manual force,
 said last-mentioned means being effective only when the turning rate of said aircraft is below a predetermined absolute value as measured by said sensing means and having a speed of response such that no neutralization of the manual force applied to said device is effected until a predetermined time after the initiation of an output signal by said sensing means.

5. In a control mechanism for an aircraft, the combination:
 a pilot operable yaw control device movable in predetermined opposite directions to change the turning rate of said aircraft,
 means for biasing said yaw control device so as to oppose movement of said device in either direction from a given zero force position, said zero force position being that position which said yaw control device will assume when no force is applied thereto,
 means operable during steady forward flight of said aircraft for sensing the difference between the actual and said zero force positions of said yaw control device and for adjusting said biasing means to bring said zero force position into alignment with said actual position with the result that zero force on said control device will correspond to steady forward flight, and
 means responsive to the turning rate of said aircraft for rendering said last-mentioned means ineffective to cause adjustment of said biasing means when the turning rate of said aircraft exceeds a predetermined value.

6. In a control mechanism for an aircraft, the combination of:
 yaw control means operable to impose different magnitudes of yaw moment on said aircraft in relation to the position of an input member which input member is movable with a relatively small degree of force,
 a pilot operable yaw control device connected with said input member and operable when moved in predetermined opposite directions to change the position of said input member and to thereby effect desired changes in the turning rate of said aircraft by changing the yaw moment imposed thereon by said yaw control means,
 means for biasing said yaw control device so as to oppose movement of said element in either direction from a given zero force position, said zero force position being that position which said yaw control device will assume when no force is applied thereto,
 means operable during steady forward flight of said aircraft for sensing the difference between the actual and said zero force positions of said yaw control device and for adjusting said biasing means to bring said zero force position into alignment with said actual position with the result that zero force on said control device will correspond to steady forward flight, and means responsive to the turning rate of said aircraft for rendering said last-mentioned means ineffective to cause adjustment of said biasing means when the turning rate of said aircraft exceeds a predetermined value.

7. In a control mechanism for an aircraft, the combination of:
  yaw control means operable to impose different magnitudes of yaw moment on said aircraft in relation to the position of an input member which input member is movable with a relatively small degree of force,
  a pilot operable yaw control device connected with said input member and operable when moved in predetermined opposite directions to change the position of said input member and to thereby effect desired changes in the turning rate of said aircraft by changing the yaw moment imposed thereon by said yaw control means,
  means for biasing said yaw control device so that the displacement of said yaw control device in either direction from its zero force position is substantially proportionally related to the force applied thereto, said zero force position being that position which said yaw control element assumes when no force is applied thereto,
  means operable during steady forward flight of said aircraft for sensing the difference between the actual and said zero force positions of said yaw control device and for adjusting said biasing means to bring said zero force position into alignment with said actual position with the result that zero force on said control device will correspond to steady forward flight, and means responsive to the turning rate of said aircraft for rendering said last-mentioned means ineffective to cause adjustment of said biasing means when the turning rate of said aircraft exceeds a predetermined value.

8. In a control mechanism for an aircraft, the combination of:
  a pilot operable yaw control device movable in predetermined opposite directions to change the turning rate of said aircraft,
  means for biasing said yaw control device so as to oppose movement of said device in either direction from a given zero force position,
  means for continuously sensing the biasing force exerted on said device by said biasing means and for providing an output signal related to the magnitude and direction thereof,
  neutralizing means connected with said biasing means and responsive to said output signal for automatically adjusting said biasing means in such a direction as to reduce said biasing force and thereby shift said zero force position with the result that after said device has been held in a given position for a given length of time the biasing force exerted thereon will be reduced to zero and said zero force position shifted to coincide with said given position,
  means for transmitting said output signal from said sensing means to said neutralizing means, and
  means responsive to the rate of turn of said aircraft for interrupting the transmission of said output signal to said neutralizing means when the turning rate of said aircraft exceeds a predetermined absolute value so that no adjustment of said biasing means and consequent shifting of said zero force position will occur when said predetermined turning rate is exceeded.

9. In a control system for an aircraft, the combination of:
  a yaw control means including an input member freely movable in predetermined opposite directions relative to other parts of said control means to vary the yaw moment imposed on said aircraft and to thereby control the aircraft rate of turn,
  a pilot operable device connected with said input member and movable in predetermined opposite directions corresponding to movement of said input member in its predetermined opposite directions,
  biasing means connected with said pilot operable device and serving to exert a bias force on said device when said device is moved in either direction from a given zero force position, said zero force position being the position to which said pilot operable device is moved by said biasing means when no manual force is applied to said device,
  means associated with said biasing means for providing an electrical output signal related to the direction and magnitude of the bias force exerted by said biasing means on said pilot operable device,
  neutralizing means responsive to said output signal and connected with said biasing means for automatically adjusting said biasing means to reduce the bias force exerted on said pilot operable device with the result that after said pilot operable device has been held in a given position for a given length of time the bias force exerted thereon will be reduced to zero and said zero force position shifted to coincide with said given position,
  means for transmitting said output signal to said neutralizing means, and
  means responsive to the rate of turn of said aircraft for interrupting the transmission of said output signal to said neutralizing means when the rate of turn of said aircraft exceeds a relatively small predetermined absolute value whereby said neutralizing means is operated to reduce said bias force only when said aircraft is maintained at a zero or relatively small rate of turn.

10. In a control mechanism for an aircraft, the combination of:
  means operable to impose a yaw moment on said aircraft which means is adjustable to vary the magnitude of said yaw moment to control the aircraft rate of turn,
  biasing means connected with said pilot operable device and serving to exert a bias force on said device when said device is moved in either direction from a given zero force position, said zero force position being the position to which said pilot operable device is moved by said biasing means when no manual force is applied to said device,
  a power boost device connected with said above-mentioned means including an input member which is substantially freely movable to different positions relative to other parts of said device and which power boost device is operable to effect adjustment of said above-mentioned means in response to said relative movement of said input member,
  a pilot operable yaw control device connected with said input member and operable when moved in predetermined opposite directions to change the position of said input member to thereby effect desired changes in the turning rate of said aircraft by changing the yaw moment imposed thereon by said above-mentioned means,
  means for continuously sensing the biasing force exerted on said device by said biasing means and for providing an output signal related to the magnitude and direction thereof,
  neutralizing means connected with said biasing means and responsive to said output signal for automatically adjusting said biasing means in such a direction as to reduce said biasing force and thereby shift said zero force position with the result that after said device has been held in a given position for a given length of time the biasing force exerted thereon will be reduced to zero and said zero force position shifted to coincide with said given position, means for transmitting said output signal from said sensing means to said neutralizing means, and means responsive to the rate of turn of said aircraft for interrupting the transmission of said output signal to said neutralizing means when the turning rate of said aircraft exceeds a predetermined absolute value so that no adjustment of said biasing means and consequent shifting of said zero force position will occur when said predetermined turning rate is exceeded.

11. In a control system for an aircraft the combination of:

yaw control means including a pilot operable device movable in predetermined opposite directions to change the turning rate of said aircraft, a bungee connected with said pilot operable device which bungee is operable to bias said pilot operable device toward a zero force position and to resist its movement in either direction from said zero force position, a potentiometer associated with said bungee and adapted to provide an electrical output signal related to the direction and magnitude of the biasing force exerted on said pilot operable device by said bungee, neutralizing means including a servomotor connected with said bungee and responsive to said output signal for adjusting said bungee in such a manner as to reduce the biasing force exerted thereby on said pilot operable device with the result that after said device has been held in a given position for a given length of time the biasing force exerted thereon will be reduced to zero and said zero force position shifted to coincide with said given position, means for transmitting said output signal from said potentiometer to said neutralizing means, a relay associated with said transmitting means and operable to interrupt the transmission of said signal, and means including a yaw rate gyro for operating said relay to interrupt the transmission of said output signal when the turning rate of said aircraft exceeds a predetermined value so that no adjustment of said bungee and consequent shifting of said zero force position will occur when the turning rate exceeds said predetermined value.

12. The combination as defined in claim 11 further characterized by:

said pilot operable device comprising a pair of foot pedals.

13. The combination as defined in claim 11 further characterized by:

said yaw rate gyro being effective to operate said relay to interrupt the transmission of said output signal when the turning rate of said aircraft exceeds approximately 3 degrees per second.

14. The combination as defined in claim 11 further characterized by:

said neutralizing device having a speed of response of approximately 4 seconds so that no adjustment of said bungee will occur until approximately 4 seconds after the initiation of an output signal by said potentiometer.

15. In a control mechanism for an aircraft, the combination of:

yaw control means including a pilot operable device movable in predetermined opposite directions to change the turning rate of said aircraft, means for continuously sensing the manual force applied to said device and for providing an output signal related to the direction and magnitude of said force, means responsive to said output signal for automatically neutralizing said manual force and having a speed of response of approximately 4 seconds so that no neutralization of the manual force applied to said device is effected until approximately 4 seconds after the initiation of an output signal by said sensing means, and means responsive to the turning rate of said aircraft for controlling the authority of said output signal over said neutralizing means and which means includes means for completely eliminating said authority when the turning rate of said aircraft exceeds approximately 3 degrees per second.

16. In a control mechanism for an aircraft, the combination of:

means including a pilot operable device movable in predetermined opposite directions to control a given motion of said aircraft, means for sensing the rate of change of said given motion, and means operable only when said rate of change of said given motion as measured by said sensing means is below a predetermined value for automatically neutralizing the pilot force applied to said pilot operable device.

17. In a control mechanism for an aircraft, the combination of:

means including a pilot operable device movable in predetermined opposite directions to control a given motion of said aircraft, means for biasing said pilot operable device so as to oppose movement of said device in either direction from its zero force position, said zero force position being that position which said device assumes when no pilot force is applied thereto, means for sensing the rate of change of said given motion, and means operable only when said rate of change of said given motion as measured by said sensing means is below a predetermined value for adjusting said biasing means to bring said zero force position of said device into alignment with the actual position of said device.

18. In a control mechanism for an aircraft, the combination of:

a pilot operable device movable in predetermined opposite directions to control a given motion of said aircraft, means for biasing said pilot operable device so as to oppose movement of said device by said pilot in either direction from a given zero force position, said zero force position being that position which said device will assume when no pilot force is applied thereto, means for sensing the difference between the actual and said zero force positions of said device and for adjusting said biasing means to bring said zero force position into alignment with said actual position, and means responsive to the rate of change of said given motion of said aircraft for rendering said last-mentioned means ineffective to cause adjustment of said biasing means when said rate of change of said given craft motion exceeds a predetermined value.

References Cited in the file of this patent
UNITED STATES PATENTS

| | | |
|---|---|---|
| 2,639,108 | Feeney et al. | May 19, 1953 |
| 2,719,684 | Peed | Oct. 4, 1955 |
| 2,923,503 | Vogel | Feb. 2, 1960 |
| 2,961,199 | Brannin et al. | Nov. 22, 1960 |